(12) United States Patent
Baggiero, II et al.

(10) Patent No.: US 10,017,953 B2
(45) Date of Patent: *Jul. 10, 2018

(54) REFUGE

(71) Applicant: Simply IV Safety LLC, Newington, CT (US)

(72) Inventors: Thomas Anthony Baggiero, II, Newington, CT (US); Thomas Anthony Baggiero, Berlin, CT (US); Michael Costardo, Berlin, CT (US); Joanne Costardo, Berlin, CT (US)

(73) Assignee: SIMPLY IV SAFETY LLC, Newington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,609

(22) Filed: Oct. 23, 2017

(65) Prior Publication Data

US 2018/0058087 A1 Mar. 1, 2018

Related U.S. Application Data

(63) Continuation of application No. 15/169,843, filed on Jun. 1, 2016, now Pat. No. 9,797,153.

(Continued)

(51) Int. Cl.
*E04H 9/06* (2006.01)
*E04H 1/12* (2006.01)
(Continued)

(52) U.S. Cl.
CPC ............. *E04H 9/06* (2013.01); *E04H 1/125* (2013.01); *E04H 9/10* (2013.01); *E04H 9/14* (2013.01);

(Continued)

(58) Field of Classification Search
CPC ................. E04H 1/125; E04H 1/1277; E04H 2001/1283; E04H 9/00; E04H 9/06;
(Continued)

(56) References Cited

U.S. PATENT DOCUMENTS 2,649,625 A 8/1953 Johnson
4,748,790 A 6/1988 Frangolacci
(Continued)

FOREIGN PATENT DOCUMENTS

CN 202745420 U 2/2013
CN 102416230 B 4/2014
(Continued)

OTHER PUBLICATIONS

"HardRock Mine Refuge Chambers—The MineARC HRM Series IV Range (Hard Rock Mine)," minearc systems product brochure, http://www.minearc.com/files/minearc/uploads-en/Series_IV%20brochure%20English%20WEB_1.pdf, Dated: Apr. 29, 2013; 9 pgs.

(Continued)

*Primary Examiner* — Adriana Figueroa
*Assistant Examiner* — Jessie T Fonseca
(74) *Attorney, Agent, or Firm* — Cantor Colburn LLP

(57) ABSTRACT

Disclosed herein is a refuge comprising a roof; at least four wall members each fixedly attached to the roof, wherein the refuge has a width of 60 inches or less, and wherein each wall member comprises a ballistic material; a door disposed in a first wall member, wherein the door has a width of at least 18 inches; a power system disposed within the enclosure, the power system comprising a primary power source and a secondary power source; and an armored air purification system configured to provide purified air to the enclosure.

17 Claims, 6 Drawing Sheets

Related U.S. Application Data

(60) Provisional application No. 62/169,261, filed on Jun. 1, 2015.

(51) Int. Cl.

| | | |
|---|---|---|
| *E04H 9/10* | (2006.01) | |
| *E04H 9/14* | (2006.01) | |
| *E04H 9/16* | (2006.01) | |
| *E06B 5/10* | (2006.01) | |
| *H02J 7/00* | (2006.01) | |
| *H02J 9/06* | (2006.01) | |

(52) U.S. Cl.
CPC ............... *E04H 9/16* (2013.01); *E06B 5/10* (2013.01); *H02J 7/0068* (2013.01); *H02J 9/06* (2013.01)

(58) Field of Classification Search
CPC .... E04H 9/10; E04H 9/14; E04H 9/16; E04H 1/12; E06B 5/10
See application file for complete search history.

(56) References Cited

U.S. PATENT DOCUMENTS

| | | |
|---|---|---|
| 5,115,613 A | 5/1992 | McCarthy |
| 5,319,903 A | 6/1994 | Holland |
| 5,467,562 A | 11/1995 | Holland |
| 5,635,394 A | 6/1997 | Horn |
| 5,813,174 A | 9/1998 | Waller |
| 6,334,278 B1 | 1/2002 | Arnold |
| 6,412,231 B1 | 7/2002 | Palatin |
| 6,415,557 B1 | 7/2002 | McCalley |
| 7,458,305 B1 | 12/2008 | Horlander et al. |
| 8,534,001 B2 | 9/2013 | Scott, IV |
| 8,858,688 B2 | 10/2014 | Barrett |
| 2005/0284035 A1 | 12/2005 | Deovando et al. |
| 2006/0254165 A1 | 11/2006 | Bishop |
| 2006/0254166 A1 | 11/2006 | Michels et al. |
| 2007/0130844 A1 | 6/2007 | Arts et al. |
| 2007/0214729 A1 | 9/2007 | Moore |
| 2011/0023759 A1 | 2/2011 | Waller |
| 2012/0151854 A1 | 6/2012 | Scott, IV |
| 2012/0222367 A1 | 9/2012 | Wirtz |
| 2013/0019542 A1 | 1/2013 | Bishop |
| 2013/0139450 A1 | 6/2013 | Scott, IV |
| 2013/0291450 A1 | 11/2013 | Hillje |
| 2014/0116870 A1 | 5/2014 | Kamen et al. |
| 2014/0259976 A1 | 9/2014 | Bowers et al. |
| 2015/0096478 A1 | 4/2015 | Magiera |
| 2016/0130830 A1 | 5/2016 | Magiera |
| 2016/0348390 A1 | 12/2016 | Baggiero, II et al. |

FOREIGN PATENT DOCUMENTS

| | | |
|---|---|---|
| DE | 20315249 U1 | 12/2003 |
| EP | 0075483 A1 | 3/1983 |
| WO | 2012101598 A2 | 8/2012 |

OTHER PUBLICATIONS

"The Bunker Book, American Safe Room's Underground Blast Resistant Bomb/Fallout Shelter System," www.AmericanBombShelter.com, File: TM-Underground-Shelter_Kit.pdf, Revision: 2E, Jun. 29, 2011, 58 pages.

REFUGE

CROSS-REFERENCE TO RELATED CASE

This application is a continuation of U.S. patent application Ser. No. 15/169,843 filed on Jun. 1, 2016, which claims the benefit of U.S. Provisional Application Ser. No. 62/169,261, filed on Jun. 1, 2015, the contents each of which are incorporated herein in their entirety by reference thereto.

BACKGROUND

(1) Field

Disclosed is a refuge.

(2) Description of the Related Art

In recent years there has been a growing concern for student and faculty safety in schools during a threat or a perceived threat of bodily harm. When a threat is detected, schools have developed lockdown practices whereby doors are locked to limit movement within the school. Nonetheless, recent events have illustrated that lockdown practices are insufficient, and have illustrated the need to provide improved options during an adverse event. Thus, there remains a need for improved safety, including safety within the school, particularly within classrooms.

SUMMARY

Disclosed herein is a refuge comprising a roof; at least four wall members each fixedly attached to the roof, wherein the refuge has a width of 60 inches or less, and wherein each wall member comprises a ballistic material; a door disposed in a first wall member, wherein the door has a width of at least 18 inches; a power system disposed within the enclosure, the power system comprising a primary power source and a secondary power source; and an armored air purification system configured to provide purified air to the enclosure.

Also disclosed is a refuge including: a roof; at least six wall members each fixedly attached to the roof, wherein the roof and the wall members define an L-shaped enclosure having a major portion and a minor portion, wherein the major portion has a width of 30 inches or less, and wherein the wall members each comprise a ballistic material; a door disposed in a first wall member of the at least six wall members, wherein the door has a width of at least 32 inches, and wherein the first wall member is on an end of the minor portion of the L-shaped enclosure; a power system disposed within the enclosure, the power system comprising a primary power source and a secondary power source; and an armored air purification system configured to provide purified air to the enclosure.

Also disclosed is a classroom including the refuge.

Also disclosed is a building such as a school including the refuge.

Also disclosed is a method of providing improved safety, the method including disposing the refuge in a building.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
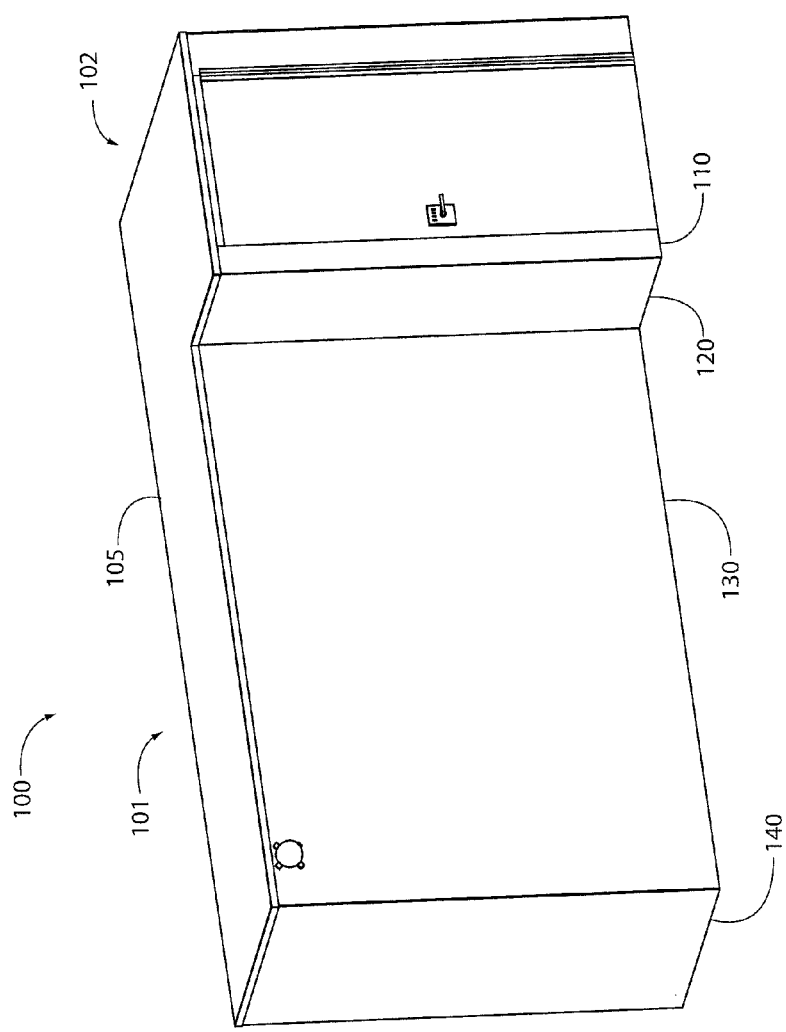
FIG. 1 is an embodiment of a front perspective view of an embodiment of a refuge.
Figure 2:
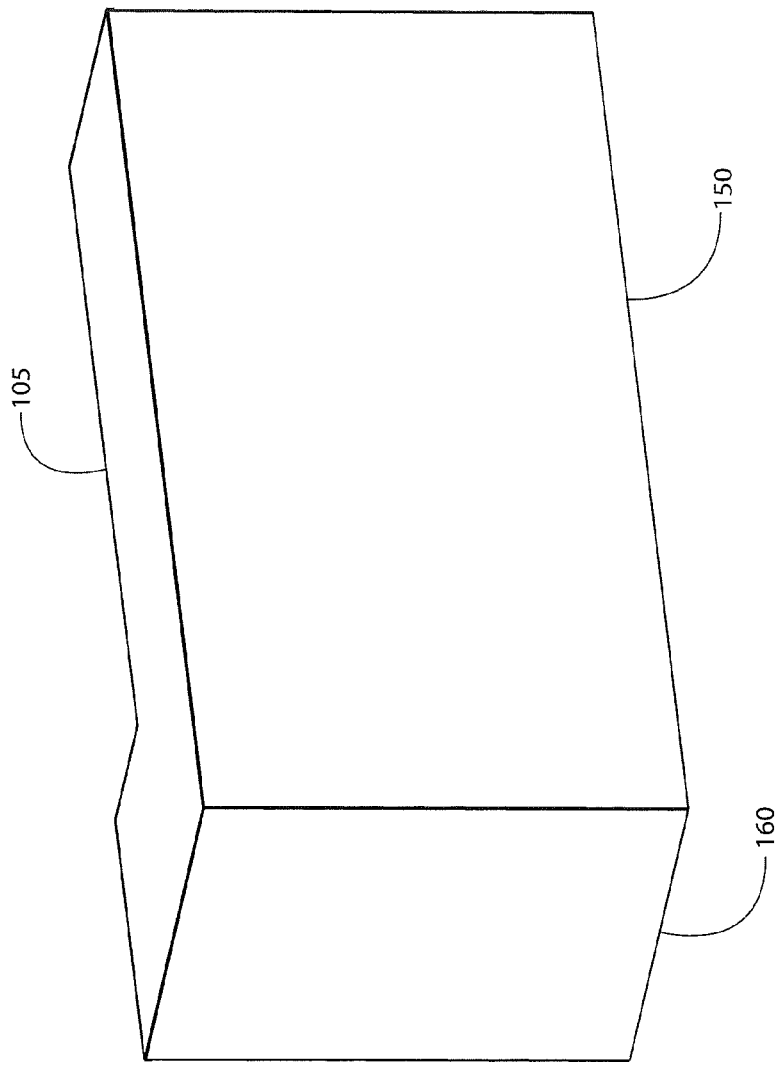
FIG. 2 is an embodiment of a rear perspective view of the refuge.
Figure 3:
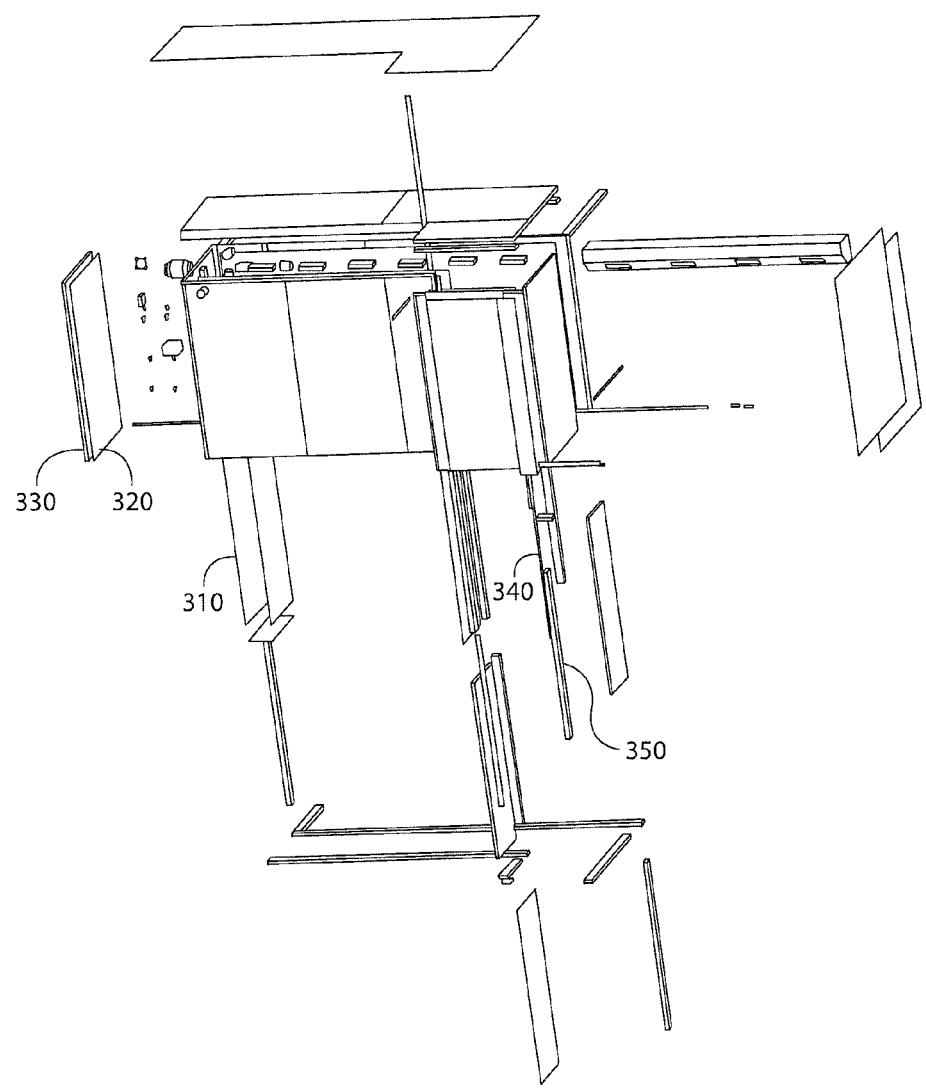
FIG. 3 is an embodiment of an exploded view of the refuge.
Figure 4:
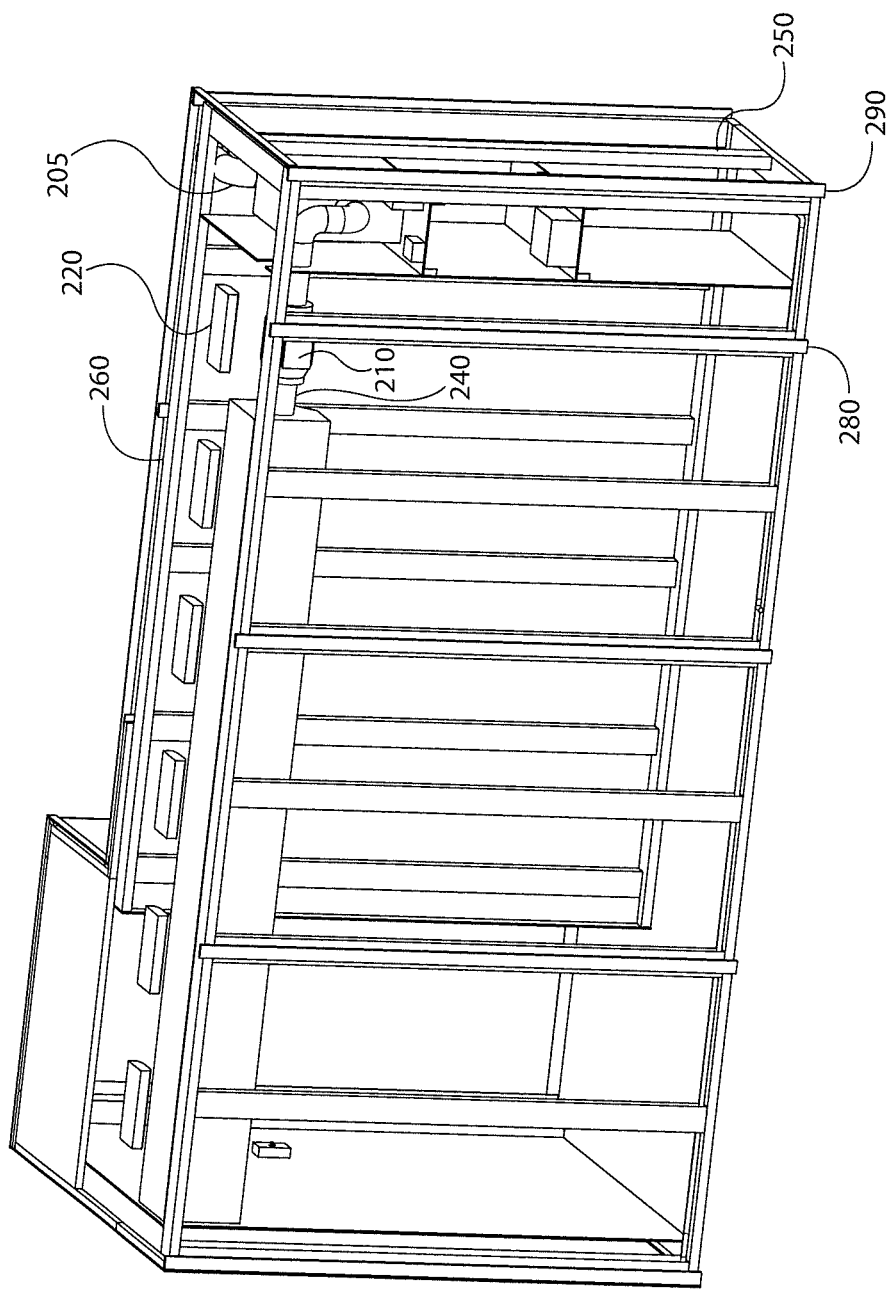
FIG. 4 is an embodiment of a rear cut-away view of the refuge.

Disclosed is a refuge, which may be disposed in a classroom to provide a safe haven for persons to congregate in the event of a threat to their safety. The walls, floor, and ceiling of a refuge can comprise a ballistic material, which can provide protection from projectiles. Advantageously, the disclosed refuge can be permanently installed in a classroom, and the refuge has a configuration and design with particular advantages for use in a classroom.

Disclosed herein is a refuge comprising a roof; at least four wall members each fixedly attached to the roof, wherein the refuge has a width of 60 inches or less, and wherein each wall member comprises a ballistic material; a door disposed in a first wall member, wherein the door has a width of at least 18 inches; a power system disposed within the enclosure, the power system comprising a primary power source and a secondary power source; and an armored air purification system configured to provide purified air to the enclosure.

Also, disclosed is a refuge comprising: at least six wall members each fixedly attached to the roof, wherein the roof and the wall members define an L-shaped enclosure having a major portion and a minor portion, wherein the major portion has a width of 30 inches or less, and wherein the wall members each comprise a ballistic material; a door disposed in a first wall of the at least six wall members, wherein the door has a width of at least 32 inches, and wherein the first wall member is on an end of the minor portion of the L-shaped enclosure; a power system disposed within the enclosure, the power system comprising a primary power source and a secondary power source; and an armored air purification system configured to provide purified air to the enclosure.

The refuge can comprise at least four wall members, or at least six wall members, or 4 to 8 wall members. The refuge can have four wall members and can have a rectangular shape. The refuge can have six wall members and can have an L-shape. The refuge can have eight wall members and can have a t-shape, a u-shape, or a z-shape (for example, having 90° angles). The refuge can have twelve wall members and can have an x-shape.

The refuge can have a width, for example, a major portion width, of 60 inches or less, or 30 inches or less, or 18 to 60 inches, or 20 to 30 inches. The door can have a width of at least 18 inches, or at least 32 inches, or 18 to 40 inches. Each wall member independently can comprise the ballistic material such that the ballistic material spans greater than or equal to 90%, or 90 to 100% of a surface area of the respective wall member. Likewise, the ballistic material can span greater than or equal to 90%, or 90 to 100% of a surface area of one or more of the door, the ceiling, and the floor of the refuge.

The refuge can comprise two or more doors located on one or more of the same or different wall member, the floor, and the ceiling. The further door can serve as a second entryway or can serve to connect the refuge to an additional refuge or to an additional room.

An embodiment of the refuge 100 is shown in FIGS. 1 to 6. As shown in FIGS. 1 to 6, the refuge may comprise a roof 105 which is connected to any suitable number of wall members, such as first to sixth wall members 110, 120, 130, 140, 150, and 160, respectively. As shown in the exploded view of FIG. 3, the roof and the wall members may each independently comprise an inner layer, a ballistic layer, and an outer layer, wherein the ballistic layer is disposed between the inner layer and the outer layer. For example, an end wall may comprise an end wall inner layer 310, an end wall ballistic layer 320, and an end wall outer layer 330.

The inner layer may comprise any suitable material, and may comprise a metal (such as steel), wood, or gypsum. An embodiment in which the inner layer is steel is specifically mentioned. Also, the inner layer may be omitted if desired. In an embodiment, the inner layer is present in the wall members, but not in the roof.

The ballistic layer may comprise any suitable ballistic material. The ballistic material may include one or more layers of woven ballistic fabric or a bi-directional composite ballistic structure. The ballistic material may have been compressed during manufacture to provide more protection for a given cross-sectional width of material. Examples of possible ballistic materials include KEVLAR® brand ballistic material, SPECTRA® brand ballistic material, SPECTRA SHIELD® brand ballistic material, an aramid, an acrylic, a polyethylene, a steel, or a combination thereof. The ballistic material may be made in any suitable configuration (e.g., thicknesses, weights) to provide a suitable level of ballistic protection (e.g., National Institute of Justice (NIJ) ballistic threat level 3A and others). A ballistic layer comprising a ballistic cloth is specifically mentioned, such as a panel comprising a woven-roving fiberglass. In an embodiment, the ballistic layer has a rating of level 1 to shotgun, level 2 to level 10, level 3 to level 9, or level 4 to level 8 in accordance with UL 752. A ballistic layer having a bullet resistance of level 7 in accordance with UL 752 is mentioned. If desired, the ballistic layer may be omitted from the roof.

As used herein, a "ballistic" material is defined as having the property of stopping, or severely retarding the progress of, a projectile such as a bullet. As used herein, "ballistic" may be used interchangeably with "bulletproof," though a ballistic material may not be completely impenetrable to all types of bullets and other projectiles under all situations. Ballistic materials are preferably of unitary construction, i.e., one continuous piece, and thus are not readily portable.

The outer layer may comprise any suitable material and may comprise a metal (such as steel), wood, or gypsum. An embodiment in which the outer layer is gypsum wallboard is mentioned. If desired, the outer layer may be omitted. Also, the outer layer may independently be selected to disguise the refuge.

The inner layer, the ballistic layer, and the outer layer, may be disposed on a plurality of studs, which form a structural frame. For example, the end wall may comprise an end wall stud 250. Also, the ceiling may be supported by a ceiling beam, such as ceiling beam 260. In addition, various brackets may be provided connecting one or more of the studs, the wall members, and the ceiling to provide additional structural integrity and rigidity.

Further still, seams between adjacent ballistic layers may be reinforced with a seam member such as seam member 280 to provide improved ballistic integrity. The seam member may comprise any suitable ballistic material. The seam member may include one or more layers of woven ballistic fabric or a bi-directional composite ballistic structure. The ballistic material of the seam member may have been compressed during manufacture to provide more protection for a given cross-sectional width of material. Examples of possible ballistic materials include KEVLAR® brand ballistic material, SPECTRA® brand ballistic material, SPECTRA SHIELD® brand ballistic material, an aramid, an acrylic, a polyethylene, a steel, or a combination thereof. The ballistic material of the seam member may be made in any suitable configuration (e.g., thicknesses, weights) to provide a suitable level of ballistic protection (e.g., National Institute of Justice (NIJ) ballistic threat level 3A and others). A seam member comprising a ballistic cloth is specifically mentioned, such as a panel comprising a woven-roving fiberglass. In an embodiment, the seam member has a rating of level 1 to shotgun, level 2 to level 10, level 3 to level 9, or level 4 to level 8 in accordance with UL 752. A seam member having a bullet resistance of level 3 in accordance with UL 752 is mentioned. If desired, the seam member may be omitted. Similarly, corners may be reinforced with a corner member, such as corner member 290, to provide an approved ballistic integrity to the corners.

The wall members can define an L-shaped enclosure having a major portion 101 and a minor portion 102. The major portion is adjacent and perpendicular to the minor portion. The major portion is selected to have a relatively narrow width so that the refuge can be disposed within a room, such as a classroom, without undue impact to the configuration of the room, and the minor portion comprises a door disposed in a wall member thereof and having a width of at least 32 inches, 32 to 45 inches, 33 to 43 inches, 34 to 41 inches, or 36 to 40 inches to permit handicap access and has dimensions suitable for providing handicap access. A door having a width of 36 inches is specifically mentioned. The major portion may have any suitable length, and may have a length of 30 inches to 300 inches, 40 inches to 250 inches, or 50 inches to 200 inches. The minor portion may have any suitable length and may have a length of 20 inches to 200 inches, 25 inches to 150 inches, or 30 inches to 100 inches. In an embodiment, the major portion has a width of 30 inches or less, 20 to 30 inches, or 22 to 28 inches. Also the minor portion may have a width of at least 32 inches, and may have a width of 32 inches to 60 inches, 33 inches to 55 inches, or 34 inches to 50 inches. In an embodiment, the major portion may have a length of 2 times to 10 times, 3 times to 9 times, or 4 times to 8 times a length of the minor portion. An embodiment in which the major portion is 3 times longer than the minor portion is specifically mentioned.

The door may comprise any suitable material, and may comprise a ballistic material such as KEVLAR® brand ballistic material, SPECTRA® brand ballistic material, SPECTRA SHIELD® brand ballistic material, an aramid, an acrylic, a polyethylene, a steel, or a combination thereof. The door may further comprise a lock assembly for securing the door in a closed configuration. The door may be hingably connected to an adjacent wall member by a hinge 340. The hinge may be a piano hinge, a lift-off hinge, a door hinge, a butt hinge, or a combination thereof. Also, the hinge may be shielded by a hinge shielding member 350. In an embodiment, the hinge is configured so that it is not exposed when the door is closed.

The refuge further comprises a power system 270 for providing electrical power to various devices such as lights, the air purification system, and the communication system. The power system may be configured to have a primary power source and a secondary power source, wherein the primary power source may be connected to grid power, and wherein the secondary power source may be a battery, a fuel cell, or a combination thereof. The power system may further comprise a battery charger, which maintains the battery in a charged state, e.g., by a trickle charging, when grid power is available. The power system may be further configured to automatically switch between power sources depending on their availability. Thus, for example, the power system may automatically switch from grid power to battery power if grid power is lost. The power system may be disposed on the shelf within the enclosure.

The refuge also comprises an armored air purification system. The air purification system comprises an armored air inlet 205 and optionally an air outlet, both of which may be shielded with a ballistic cap 206 to prevent or reduce the likelihood of penetration by a projectile. The air inlet and the air outlet can be located on the same or different walls and/or on the ceiling of the refuge. The air inlet and the air outlet can be located proximal to each other, for example, within 12 inches or can be located at a distance of greater than or equal to 12 inches, for example, 24 to 60 inches away from each other. The air inlet can be free of a blower and the air outlet can comprise a blower.

Figure 5:
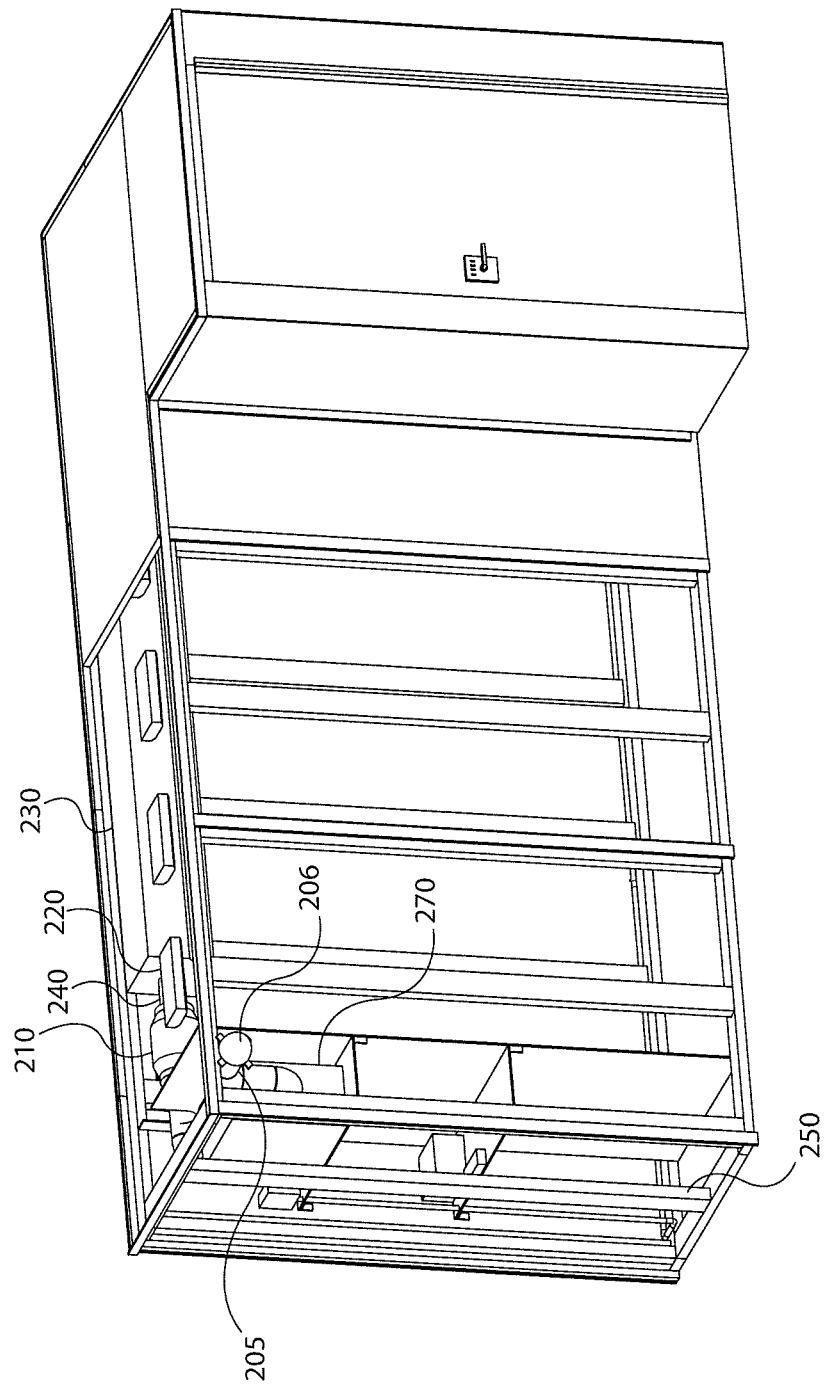
FIG. 5 is an embodiment of a front cut-away view of the refuge.
Figure 6A:
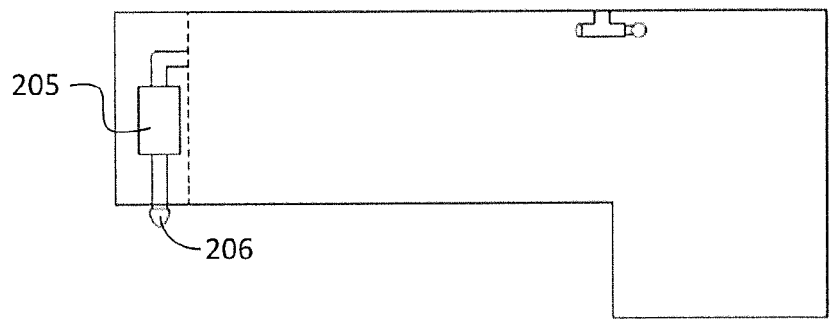
FIG. 6A and FIG. 6B are embodiments of a top view and a side view, respectively, of the refuge.
Figure 6B:
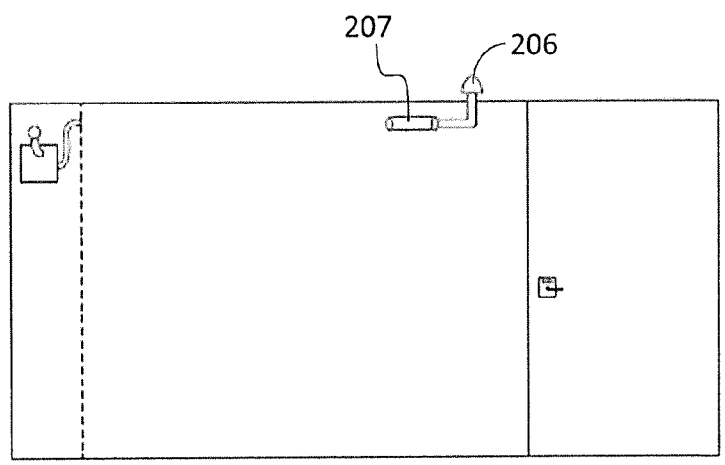

FIG. 5 illustrates that the air inlet and optionally the air outlet can be located on third wall 130 in a region proximal to fourth wall 140. FIG. 6A and FIG. 6B illustrate that the air inlet 205, for example, without a blower motor, can be located on third wall 130 in a region proximal to fourth wall 140 and the outlet 207, for example, with a blower motor, can be located on fifth wall 150. When the air inlet 205 is located proximal to fourth wall 140, it can be located within 30 inches or within 20 inches of fourth wall 140. When the air outlet 207 is located on fifth wall 150, it can be equidistant from or located closer to sixth wall 160 than to fourth wall 140. For example, the ratio of a first distance of air outlet 207 from fourth wall 140 to a second distance of air outlet 207 from sixth wall 160 can be 1:1 to 10:1, or 1:1 to 4:1. It is understood that the air outlet could likewise be located on any of the fourth wall 140, the sixth wall 160, the first wall 110, the second wall 120, the third wall 130, or on the ceiling. The air outlet can be shielded with a ballistic cap 206 to prevent or reduce the likelihood of penetration by a projectile.

The air purification system may further comprise a filter, wherein the filter may be configured to remove undesired contaminants from the air, and a blower 210 which is configured to draw in outside air, e.g., through the filter if present. The filter may be a particulate filter, a chemical filter, or a combination thereof. In an embodiment, the filter comprises a carbon-based chemical filter for removing toxic substances from the air, and optionally further comprise a particulate filter. The particular filter may be a high-efficiency particulate (HEPA) filter. The chemical filter may be configured to remove organic vapors, inorganic vapors, acids, or a combination thereof. The blower may be configured to maintain a positive pressure within the enclosure, e.g., a pressure of 0.1 megaPascal (mPa) to 100 mPa, or 1 mPa to 10 mPa. The blower may direct air to an air distribution manifold 230 via a duct 240. A utility cover, for example, a wall, can be present in the refuge to hide components of the air purification system from view.

The refuge can comprise any number of other utilities, for example, a communications system and lighting 220. The communications system may be configured to provide a means of communication outside the refuge. A two-way radio is mentioned.

The refuge can be disposed in a building. The building can be disposed in a public building or a privately owned building. The building can be disposed in a government building. The building can be disposed in an office building, a store, a dormitory, an apartment building, or a house. The refuge can be disposed in a school, for example, in a classroom of the school.

A refuge can be permanently disposed in the building, for example, in a classroom of a school. The refuge can be permanently disposed, for example, by being affixed to a wall or a floor of the building, for example, of a classroom. Conversely, the refuge can be modular such that it can be constructed in a pre-existing room of a building, for example, for a length of time. The refuge can be disguised, for example, through the use of white boards, smart boards, or cabinetry that can be affixed to the outer layer of any of the wall members, for example.

The disclosure has been described with reference to the accompanying drawings, in which various embodiments are shown. This disclosure may, however, be embodied in many different forms, and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

What is claimed is:

1. A refuge comprising:
a roof;
at least six wall members each fixedly attached to the roof, wherein the roof and the wall members define an L-shaped enclosure having a major portion and a minor portion, each being rectangular shaped,
the major portion having a first lengthwise external end, a first lengthwise internal end, a first lengthwise span, and a first widthwise span;
the minor portion having a second lengthwise external end, a second lengthwise internal end, and a second widthwise span;
wherein the first lengthwise internal end of the major portion and the first lengthwise internal end of the minor portion intersect to define an internal corner of the refuge; and
the refuge including
an internal enclosure disposed at the first lengthwise external end of the major portion;
a power system being disposed within the internal enclosure, the power system comprising a primary power source and a secondary power source;
an armored air purification system configured to provide purified air to the enclosure, including an air intake and air filter system, the intake and filter system disposed in the internal enclosure;
an entry door disposed at the second lengthwise external end of the minor portion, the entry door, when closed, facing a lengthwise wall of the major portion;
the entry door having a widthwise span of at least 32 inches to provide for handicap access, the minor portion having a widthwise span that is large enough to fit the entry door;
the widthwise span of the major portion being less than the widthwise span of the entry door; and
the lengthwise span of the major portion being at least three times the widthwise span of the major portion, and being substantially larger than the widthwise span of the minor portion;
wherein the armored air purification system further includes:
a blower,
an air exhaust within (i) the major portion and proximate to the internal corner, (ii) the internal corner, or (iii) the minor portion and between the internal corner and the entry door, and
the blower configured to blow air into the air intake, through the armored air purification system, and out of the exhaust, whereby pressurized filtered air is provided to the refuge.

2. The refuge of claim 1, wherein the roof, a floor, and the wall members are permanently connected.

3. The refuge of claim 1, wherein the major portion has a length of 2 times to 10 times of a length of the minor portion.

4. The refuge of claim 1, wherein the ballistic material comprises an aramid, a polyethylene, a metal, or a combination thereof.

5. The refuge of claim 1, wherein the primary power source is a grid power and wherein the secondary power source is a battery, and wherein the power system further comprises a charger which is configured to maintain the battery of the secondary power source.

6. The refuge of claim 1, wherein the power system is configured to automatically switch from grid power to battery power when grid power is lost.

7. The refuge of claim 1, wherein the armored air purification system comprises a ballistic shield, and comprises a filter configured to remove toxic substances from air.

8. The refuge of claim 1, wherein the armored air purification system is configured to maintain the refuge at a pressure greater than an ambient pressure.

9. A building comprising the refuge of claim 1.

10. The building of claim 9, wherein the building is a school, an office building, or a house.

11. The building of claim 10, wherein the refuge is permanently installed in the classroom or other schoolroom.

12. A method of providing improved safety, the method comprising disposing the refuge of claim 1 in a classroom or other schoolroom.

13. The refuge of claim 1, wherein the refuge has a width of 60 inches or less, and wherein each wall member comprises a ballistic material.

14. The refuge of claim 1, wherein the purification system includes an air blower, disposed within the refuge and exterior to the internal enclosure, configured to provide positive pressure in the refuge, and configured to exhaust air from within the refuge to the exterior of the refuge.

15. The refuge of claim 1, including lighting configured to be powered by the power system.

16. A refuge comprising:
an L shaped configuration, formed by
a major portion with a first external end and a first vertex end; and a minor portion with a second external end and a second vertex end,
wherein the first vertex end and the second vertex end intersect to define an internal corner of the refuge, and the major portion is longer than the minor portion,
an entry door located in the second external end, furthest from the major portion, wherein the minor portion is narrower than 40 inches, the entry door is wide enough for handicap access, and the major portion is narrower than the entry door,
a utility area in the external end of the major portion, furthest from the minor portion, the utility area being partitioned from the rest of the refuge,
the utility area including a power system configured to power electrical services throughout the refuge and an air intake and air filter assembly configured to fluidly communicate filtered air to an air distribution manifold in the major portion, and
a blower configured to blow air delivered by the manifold into the major portion;
wherein the refuge includes an air purification system, including:
the air intake, air filter assembly, and the blower,
an air exhaust within (i) the major portion and proximate to the internal corner, (ii) the internal corner, or (iii) the minor portion and between the internal corner and the entry door, and
the blower configured to blow air into the air intake, through the air purification system, and out of the exhaust, whereby pressurized filtered air is provided to the refuge.

17. The refuge of claim 16, wherein a primary power source for the power system is grid power and a secondary power source for the power system is a battery disposed in the utility area, and the power system further comprises a charger disposed in the utility area which is configured to maintain the battery charge, and the power system is configured to automatically switch from grid power to battery power when grid power is lost.

* * * * *